(12) United States Patent
Lee

(10) Patent No.: US 11,079,266 B2
(45) Date of Patent: Aug. 3, 2021

(54) COLLAPSIBLE SCOOP

(71) Applicant: TricorBraun Inc., St. Louis, MO (US)

(72) Inventor: Jay Lee, Carol Stream, IL (US)

(73) Assignee: TricorBraun Inc., St. Louis, MO (US)

( * ) Notice: Subject to any disclaimer, the term of this patent is extended or adjusted under 35 U.S.C. 154(b) by 0 days.

(21) Appl. No.: 16/894,327

(22) Filed: Jun. 5, 2020

(65) Prior Publication Data

US 2020/0386599 A1 Dec. 10, 2020

Related U.S. Application Data

(60) Provisional application No. 62/857,861, filed on Jun. 6, 2019.

(51) Int. Cl.
*G01F 19/00* (2006.01)

(52) U.S. Cl.
CPC .................. *G01F 19/002* (2013.01)

(58) Field of Classification Search
CPC ..................................... G01F 19/002
USPC ........................................ 73/426
See application file for complete search history.

(56) References Cited

U.S. PATENT DOCUMENTS

| 3,798,975 | A | * | 3/1974 | Horst | G01F 19/002 |
| | | | | | 73/429 |
| 5,325,717 | A | * | 7/1994 | Robbins | G01F 19/00 |
| | | | | | 73/426 |
| D370,421 | S | * | 6/1996 | Tucker | D10/46.3 |
| D388,718 | S | * | 1/1998 | Weterrings | D10/46.3 |

* cited by examiner

*Primary Examiner* — Jamel E Williams
(74) *Attorney, Agent, or Firm* — Husch Blackwell LLP

(57) ABSTRACT

A scoop for the transfer of product from a container includes a head portion including a bowl portion; a handle portion slidably engageable with the head portion, the handle portion having a first position and a second position relative to the head portion; wherein in the first position, the handle portion at least partially overlaps part of the head portion such that at least part of the bowl portion is covered by the handle portion; wherein in the second position, the handle portion extends away from the head portion such that the bowl portion is no longer covered by the handle portion; wherein the length of the scoop being greater in the second position than in the first position.

4 Claims, 7 Drawing Sheets

COLLAPSIBLE SCOOP

CROSS REFERENCE

This application claims the benefit of and priority to U.S. Provisional Patent Application No. 62/857,861 filed on Jun. 6, 2019, the entire disclosure of which is expressly incorporated herein by reference.

TECHNICAL FIELD

This invention relates generally to consumer containers and, more particularly, to adjustable transfer implements suitable for use with such containers.

BACKGROUND

Powders or substances that are mixed into food or drink are bought in containers. Such additives are generally mixed with a liquid in a desired ratio. However, it can be difficult for people to find measuring spoons and/or measuring cups every time the drink or food is desired. Thus, manufacturers have started to include a scoop, which can be used instead of a measuring spoon, within containers. However, the powder inside the container may shift and cover the scoop during transport, making the scoop difficult to locate and use.

One method of preventing the scoop from becoming lost under the powder is to place the scoop within a neck of the container. However, the size and length of the scoop is limited by the circumference or perimeter of the neck. For example, when the scoop is placed within the neck of the container, the overall height of the scoop should be shallow enough that it can still fit within the container over the powder. The bowl of the scoop should also be large enough that the desired amount of powder fits within the bowl of the scoop. The handle should also be long enough for the user to reach the powder from the bottom of the container. These three points often come into conflict with each other. Depending on the neck of the container, a longer handle may shorten the space available for the bowl. Similarly, a deeper bowl may not fit in the neck of the container.

SUMMARY OF THE DISCLOSURE

This section provides a general summary of the disclosure and is not comprehensive of the full scope or all of the features disclosed elsewhere herein.

According to a first aspect of the present disclosure, there is provided a scoop for the transfer of product from a container that includes a head portion including a bowl portion; a handle portion slidably engageable with the head portion, the handle portion having a first position and a second position relative to the head portion; wherein in the first position, the handle portion at least partially overlaps part of the head portion such that at least part of the bowl portion is covered by the handle portion; wherein in the second position, the handle portion extends away from the head portion such that the bowl portion is no longer covered by the handle portion; wherein the length of the scoop being greater in the second position than in the first position.

According to another aspect of the present disclosure, there is provided a scoop for transfer of product from the container that includes a head portion including a bowl portion; a handle portion slidably engageable with the head portion, the handle portion having a first position and a second position relative to the head portion; wherein in the first position, the handle portion at least partially overlaps part of the head portion such that at least part of the bowl portion is covered by the handle portion; wherein in the second position, the handle portion extends away from the head portion such that the bowl portion is no longer covered by the handle portion; wherein the length of the scoop being greater in the second position than in the first position; and a ledge formed in a distal end of the bowl portion, the ledge being oriented generally parallel with a top surface of the scoop and at a first distance below the top surface of the scoop and configured to rest on a portion of at least one protrusion projecting inwardly within an opening in a neck of the container.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION OF THE INVENTION

Figure 1:
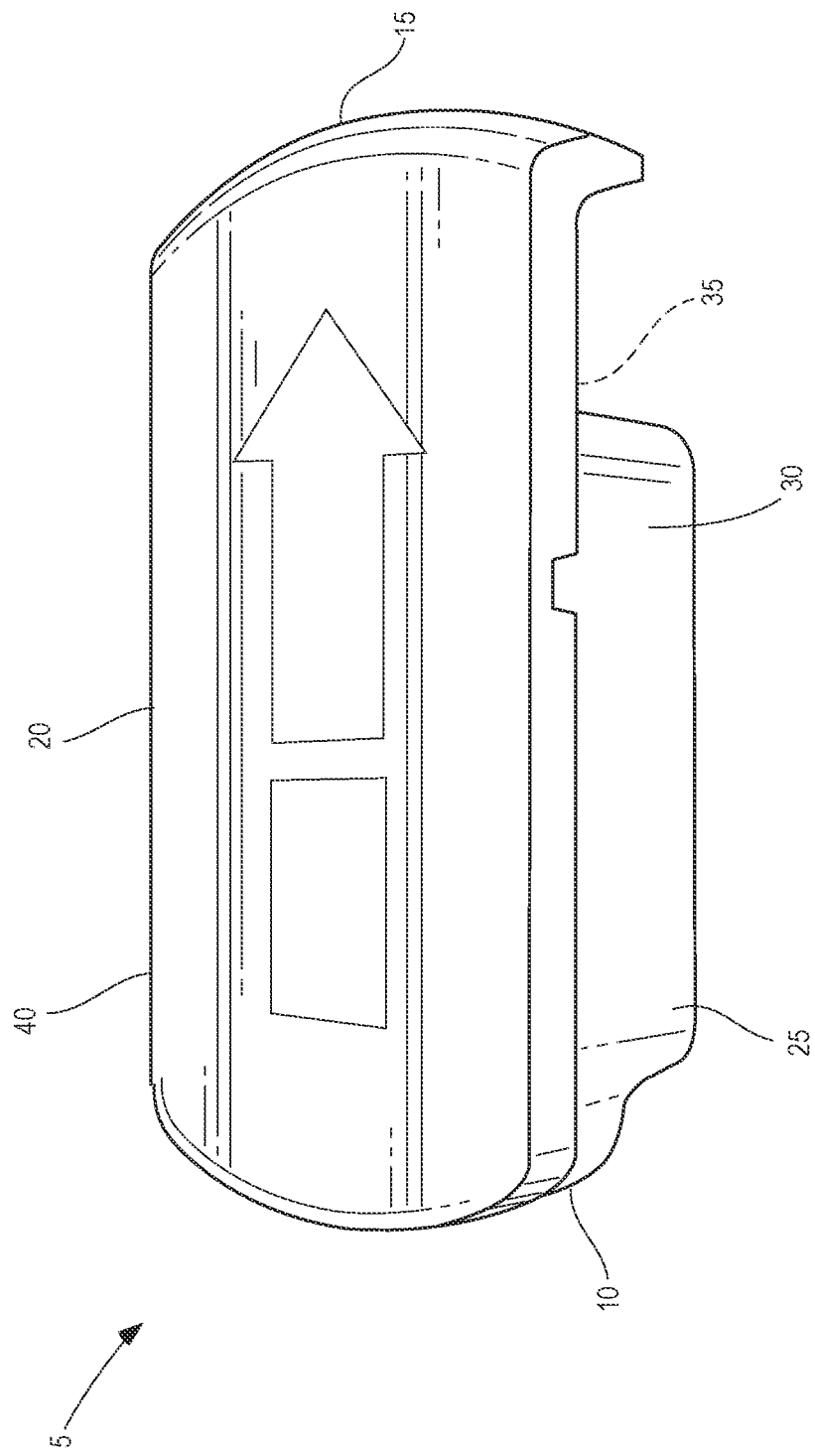
FIG. 1 depicts a top perspective view of a scoop according to an embodiment of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Example embodiments are provided so this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The methods, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
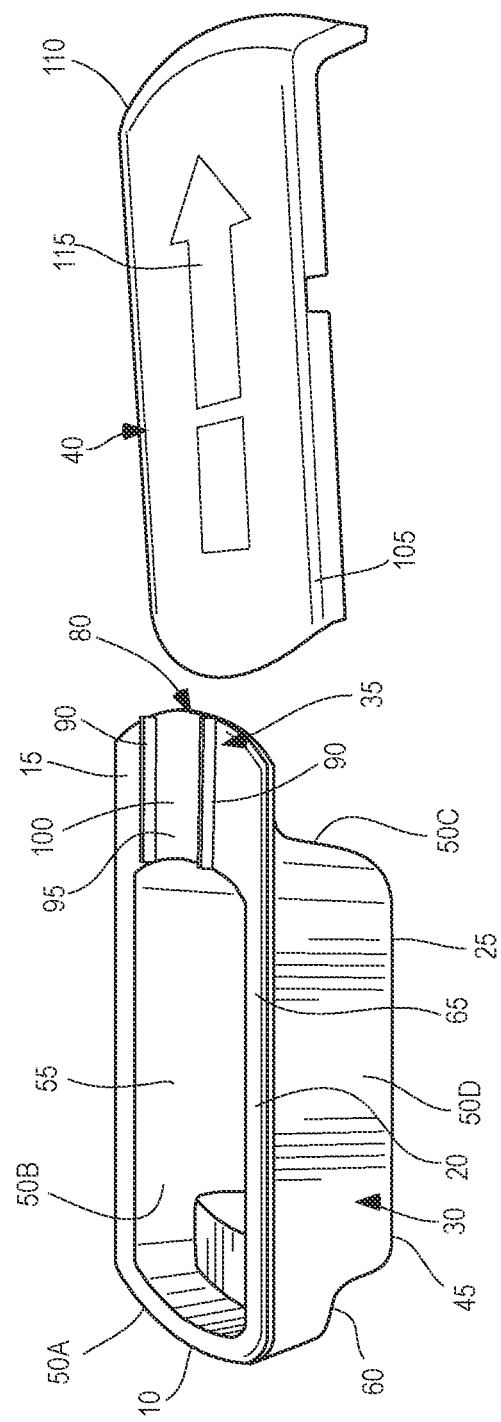
FIG. 2 depicts an exploded top perspective view of the scoop of FIG. 1.
Figure 3:
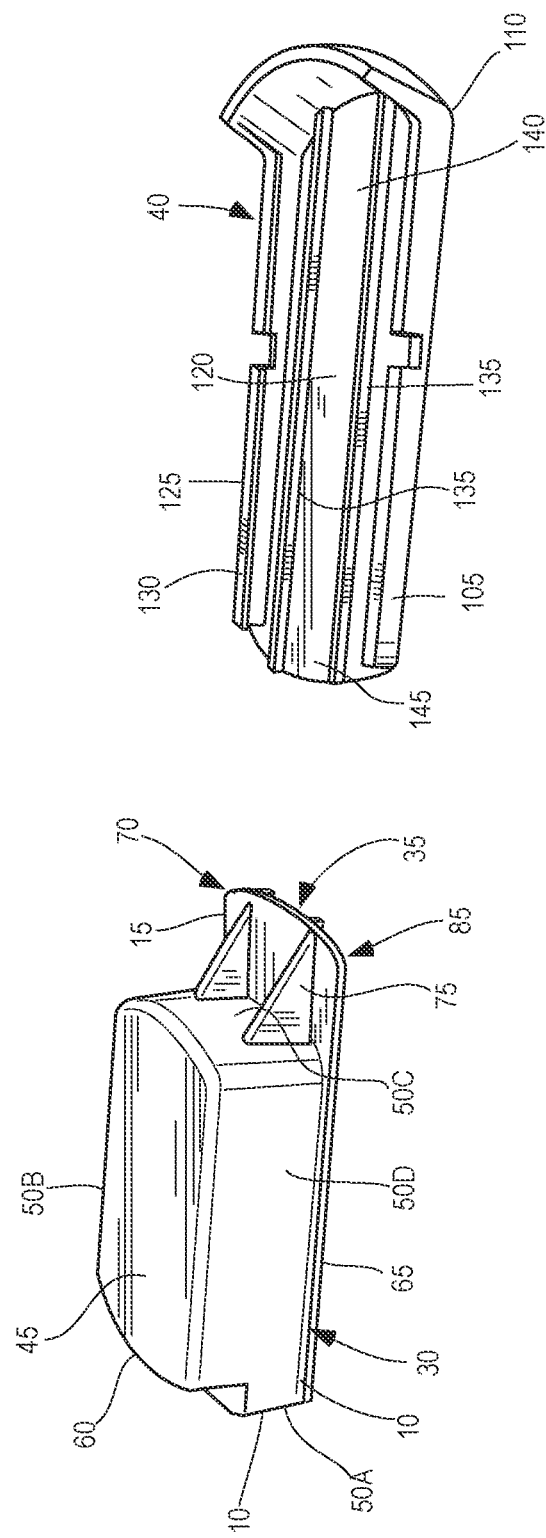
FIG. 3 depicts an exploded bottom perspective view of the scoop of FIG. 1.

As illustrated in FIGS. 1 and 2, a scoop 5 includes a first scoop end 10 and a second scoop end 15, as well as a top surface 20 and a bottom surface 25. The scoop 5 further includes a head portion 30, a support portion 35, and a handle portion 40. Turning to FIGS. 2 and 3, in one embodiment, the head portion 30 is a cup-like or bowl-like member. The head portion 30 includes a bottom wall 45 and four sidewalls 50A, 50B, 50C, and 50D that project away from the bottom wall 45 to form a bowl portion 55. As seen in FIGS. 2 and 3, the head portion 30 further includes a ledge 60 located and positioned at sidewall 50A. The ledge 60 is formed by an indention at the bottom surface 25 and extends upwards towards the top surface 20 and inwards towards the second scoop end 15. The length of the head portion 30 at the bottom surface 25 is therefore smaller than the length of the head portion 30 at the top surface 20. The head portion 30 also has a head portion rim 65. The head portion rim 65 extends perpendicularly outwards or away from both sidewalls 50B and 50D at the top scoop end 20. The head portion rim 65 further extends across the sidewalls 50B and 50D from the first scoop end 10 towards the second scoop end 15. Thus, the head portion rim 65 on the sidewall 50B and the head portion rim 65 on the sidewall 50D are on opposite sides.

The support portion 35 of the scoop 5 includes an attachment section 70 and at least one support member 75. The attachment section 70 is a substantially planar member with a top attachment face 80 and a bottom attachment face 85. The attachment section 70 projects away from the sidewall 50C. The attachment section 70 may also be substantially level with the top surface 20.

The at least one support member 75 may be a planar triangular structure that is substantially perpendicular to both the bottom attachment face 85 and the sidewall 50C. The at least one support member 75 may extend diagonally from the bottom attachment face 85 to the sidewall 50C. In the currently illustrated embodiment, the scoop 5 includes two support members 75. However, in alternative embodiments, the scoop 5 may include a greater or lesser number of support members 75. The support members 75 may assist in supporting the weight of the head portion 30 and anything that is placed within the bowl portion 55 and supporting the attachment section 70.

The attachment section 70 further includes a first track 90, a first attachment stop 95, and a second attachment stop 100 located and positioned on the top attachment face 80. The first track 90 may be two linear protrusions that extend parallel to each other from the first scoop end 10 towards the second scoop end 15 on the top attachment face 80. The first attachment stop 95 may also be a linear protrusion that extends between the protrusions of the first track 90. The first attachment stop 95 may be substantially perpendicular to the first track 90. The first attachment stop 95 may be further located closer to the sidewall 50C then the second attachment stop 100. The first attachment stop 95 preferably has a lower height than the first track 90 and/or the second attachment stop 100. Like the first attachment stop 95, the second attachment stop 100 may also be a linear protrusion and is preferably located and positioned spaced apart from and parallel to the first attachment stop 95. In alternative embodiments, the scoop 5 may not include the first or second attachment stops 95 and 100. In still yet another embodiment, the heights of the first and second attachment stops 95 and 100 may be different than described previously.

In addition to the head portion 30 and the support portion 35, the scoop 5 further includes the handle portion 40. The handle portion 40 includes a first handle end 105 and a second handle end 110. The handle portion 40 further includes a top surface 115 and a bottom surface 120. The handle portion 40 is preferably planar at the first handle end 105 before curving downwards at the second handle end 110.

The handle portion 40 further includes a handle portion rim 125. The handle portion rim 125 is located and positioned on opposite sides of the handle portion 40 and extends from the first handle end 105 towards the second handle end 110. The handle portion rim 125 projects downwardly before turning towards the center of the handle portion 40 forming either a L-like shape or a backwards L-like shape. Together, the handle portion rim 125 and bottom surface 120 form a space 130 shaped and sized so that the head portion rim 65 may fit within the space 130.

The bottom surface 120 may further include a second track 135. Like the first track 90, the second track 135 may also be two linear protrusions that are parallel to each other. The second track 135 preferably extends from the first handle end 105 towards the second handle end 110. In the current embodiment, the second track 135 is further spaced apart than the first track 90 so that the first track 90 may be placed in between the protrusions of the second track 135, and vice versa in other embodiments. The first track 90 is preferably substantially located along and abuts the second track 135 when the handle portion 40 is in a first position, as will be explained hereinafter.

The first and second tracks 90 and 135, in conjunction with the handle portion rim 125 and the head portion rim 65, preferably ensure that the handle portion 40 can slidably engage with the head portion 30 and support portion 35. The second handle portion face 120 may further include a first handle stop 140 and a second handle stop 145. The first handle stop 140 may be located and positioned within and is substantially perpendicular to the second track 135, and near the second scoop end 15. The second handle stop 145 may also be located and positioned within and substantially perpendicular to the second track 135.

Figure 4:
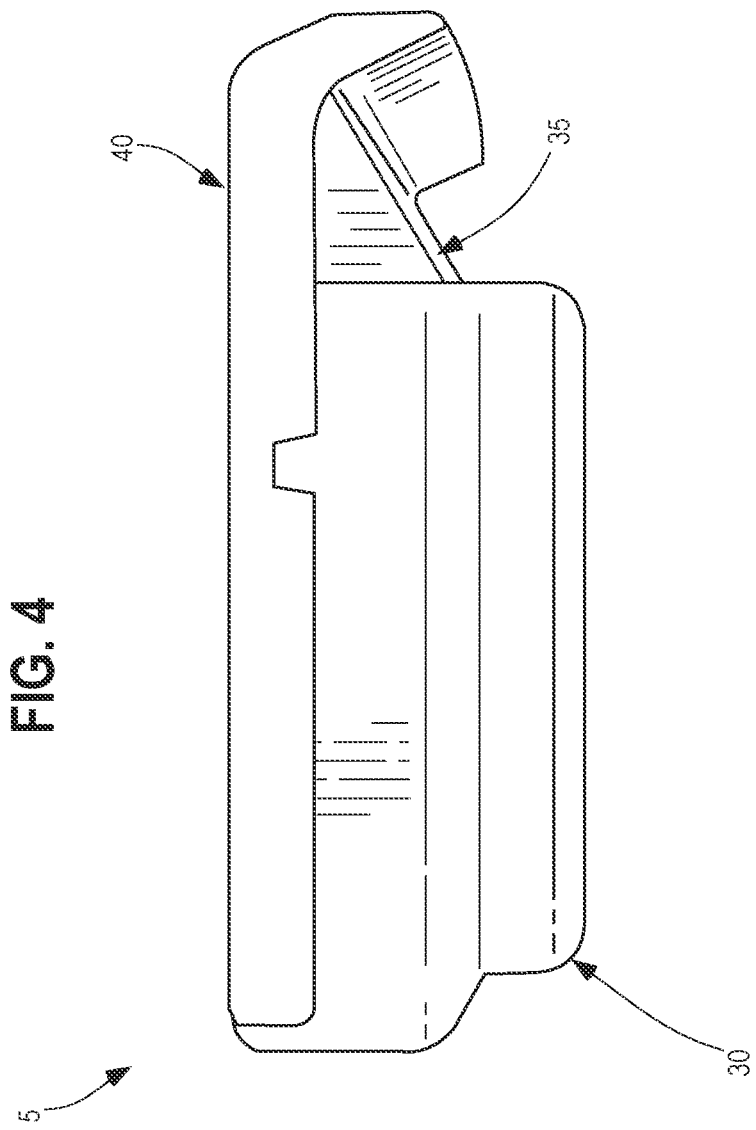
FIG. 4 depicts an elevation view of the scoop of FIG. 1 in a closed position.

The handle portion 40 may slidably engage the head portion 30 and support portion 35. The handle portion 40 has a first position and a second position. As illustrated in FIG. 4, the scoop 5 is collapsed in its first position, with the handle portion 40 extended over both the head portion 30 and the support portion 35. In the first position, the head portion rim 65 and the handle portion rim 125 abut and engage one another (not shown). Similarly, the first track 90 and the second track 135 also abut and engage each other in the first position. In one embodiment, the first handle portion stop 140 and second attachment stop 100 are preferably adjacent to and abuts one another, thereby preventing the handle portion 40 from extending past the head portion 30. The curved portion at the second handle end 110 of the handle portion 40 also prevents the handle portion 40 from sliding off the head portion 30 and support portion 35.

Figure 5:
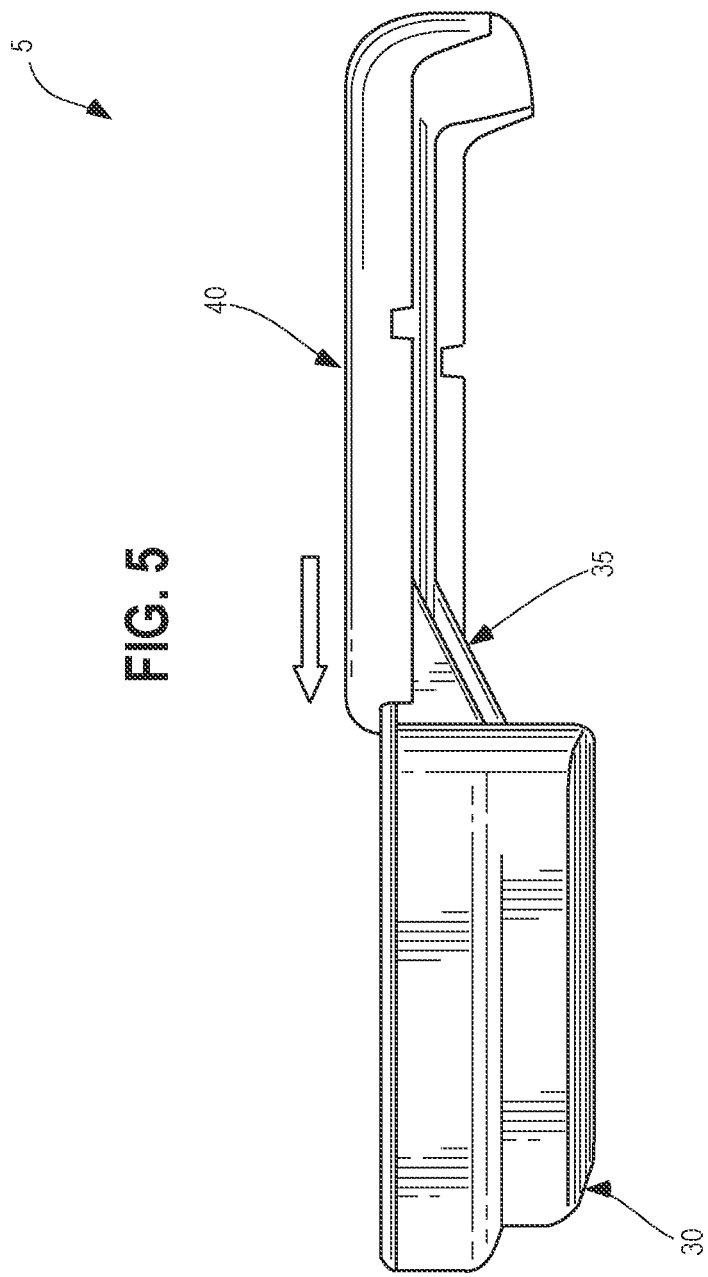
FIG. 5 depicts an elevation view of the scoop of FIG. 1 in an extended position.

Turning to FIG. 5, the scoop 5 also has a second position, where the handle portion 40 is fully extended. In the second position, the handle portion 40 may be used as a handle. The telescoping handle portion 40 is positioned so that the handle portion 40 preferably only extends over the support portion 35. In the second position, the second handle stop 145 of the handle portion 40 may be located and positioned in between the first attachment stop 95 and a second attachment stop 100 of the support portion 35. In one embodiment, the first attachment stop 95 is lower in height than the second attachment stop 100. The height of the first attachment stop 95 allows the second handle stop 145 to slide over the first attachment stop 95 thereby preventing the scoop 5 from collapsing. In other words, the first attachment stop 95 allows the handle portion 40 to remain fully extended without the handle portion 40 sliding back over the head portion 30. However, the height of the first attachment stop 95 is preferably low enough so that the scoop 5 may still be collapsed. In one embodiment, the second attachment stop 100 preferably prevents the handle portion 40 from sliding off of the support portion 35 so that the handle portion 40 remains engaged with the support portion 35.

The user may therefore slide the telescoping handle portion 40 from a first position to a second position and vice versa. The handle portion 40 of the scoop 5 may therefore be extended so that a person may use the handle portion 40 as a handle. The handle portion 40 may be also collapsed so that it can better fit within a container 200, as will be explained in more detail hereinafter.

Figure 6:
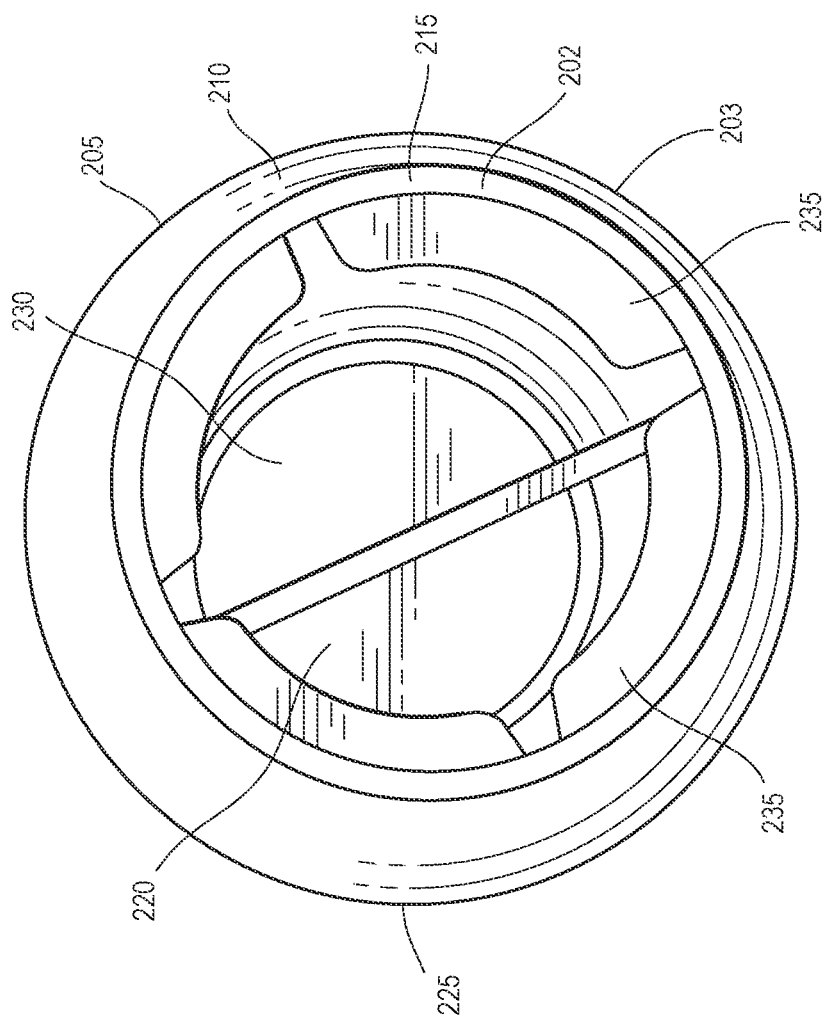
FIG. 6 depicts a top plan view of a container configured for use with a scoop according to various embodiments of the present disclosure.

As illustrated in FIG. 6, the container 200 includes a first container end 202 and a second container end 203. The container 200 further includes a vessel section 205, a shoulder section 210, and a neck section 215. The vessel section 205 also includes a base 220 located and positioned at the second container end 203. An at least one sidewall 225 projects away from the base 220 towards the first container end 202 forming the vessel section 205. The shoulder section 210 tapers inwardly from the at least one sidewall 225, near the first container end 202, before continuing to extend towards the first container end 202 to form the neck section 215. The neck section 215 may be an annular ring which allows access to a cavity 230. Powders, mixes, and other substances may be placed within and stored in the cavity 230 of the container 200. The container 200 further includes at least one container protrusion 235 that projects away from the inner surface of the neck section 215.

Figure 7:
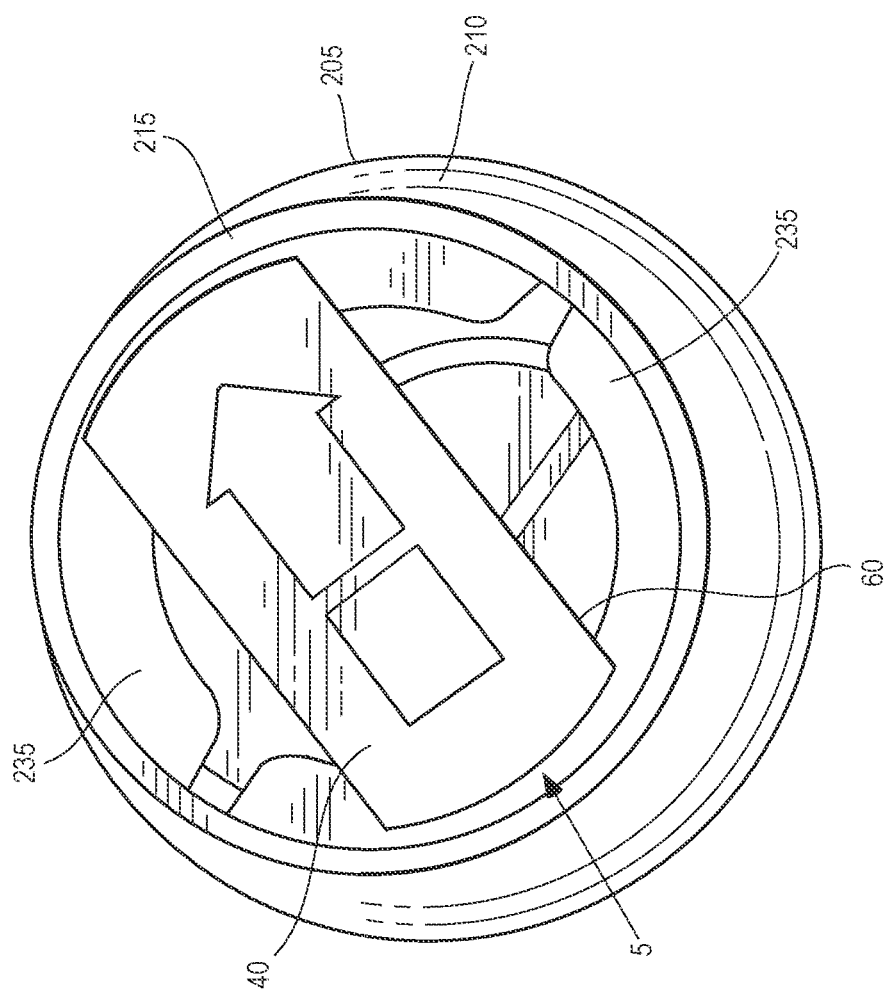
FIG. 7 depicts a top perspective view of the scoop of FIG. 1 placed within the container of FIG. 6.

The at least one container protrusion 235 allows the scoop 5, when the scoop 5 is in its first position, to be placed within the container 200 as seen in FIG. 7. The bowl portion 55 (shown in FIG. 2) is preferably large enough so that user is not required to use the scoop 5 several times to remove the desired amount of substance from the container 200. Due to the size of head portion 30, the handle portion 40 may not fit within the neck section 215 of the container 200. The scoop 5 may be collapsed so that the handle portion 40 extends over the head portion 30 and support portion 35 (shown in FIG. 2). The scoop 5 is therefore approximately the same length as the head portion 30 and support portion 35. When the scoop 5 is placed into the container 200, the ledge 60 of the head portion 30 and curved portion of the handle portion 40 preferably abuts the at least one protrusion 235.

The at least one protrusion 235 allow the scoop 5 to remain outside and above the substance stored within the container 200 so that the scoop 5 does not become lost or buried. When the user desires to use the scoop 5, the user may remove the scoop 5 from the container 200 and extend the handle portion 40. The user may grip the handle portion 40 and use the scoop 5 to remove the substance within the container 200. The user therefore has something to grip and also does not need to fit his hand through the narrow neck section 215 to reach and remove the substance from the container 200.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A scoop for the transfer of product from a container, comprising:
   a head portion including a bowl portion;
   a handle portion slidably engageable with the head portion, the handle portion having a first position and a second position relative to the head portion;
   wherein in the first position, the handle portion at least partially overlaps part of the head portion such that at least part of the bowl portion is covered by the handle portion;
   wherein in the second position, the handle portion extends away from the head portion such that the bowl portion is no longer covered by the handle portion;
   wherein the length of the scoop being greater in the second position than in the first position; and further comprising a ledge formed in a distal end of the bowl portion, the ledge being oriented generally parallel with a top surface of the scoop and at a first distance below the top surface of the scoop.

2. The scoop for transfer of product from a container as set forth in claim 1, further comprising at least a distal portion of the handle portion located at approximately the first distance below the top surface of the scoop.

3. A scoop for the transfer of product of product from a container, comprising:
   a head portion including a bowl portion;
   a handle portion slidably engageable with the head portion, the handle portion having a first position and a second position relative to the head portion;
   wherein in the first position, the handle portion at least partially overlaps part of the head portion such that at least part of the bowl portion is covered by the handle portion;
   wherein in the second position, the handle portion extends away from the head portion such that the bowl portion is no longer covered by the handle portion;
   wherein the length of the scoop being greater in the second position than in the first position;
   a head rim extending around at least a portion of a periphery of the head portion; and
   first and second handle rims extending along the sides of at least a proximal portion of the handle portion, the first and second handle rims each having a first section projecting downwardly from the handle portion and a second section extending inwardly, the first and second handle rims being configured to engage the head rim to direct linear movement of the handle portion relative to the head portion between the first and second positions.

4. A scoop for transfer of product from the container, comprising:
   a head portion including a bowl portion;
   a handle portion slidably engageable with the head portion, the handle portion having a first position and a second position relative to the head portion;
   wherein in the first position, the handle portion at least partially overlaps part of the head portion such that at least part of the bowl portion is covered by the handle portion;
   wherein in the second position, the handle portion extends away from the head portion such that the bowl portion is no longer covered by the handle portion;
   wherein the length of the scoop being greater in the second position than in the first position; and
   a ledge formed in a distal end of the bowl portion, the ledge being oriented generally parallel with a top surface of the scoop and at a first distance below the top surface of the scoop and configured to rest on a portion of at least one protrusion projecting inwardly within an opening in a neck of the container.

* * * * *

UNITED STATES PATENT AND TRADEMARK OFFICE
CERTIFICATE OF CORRECTION

PATENT NO. : 11,079,266 B2
APPLICATION NO. : 16/894327
DATED : August 3, 2021
INVENTOR(S) : Jay Lee Page 1 of 1

It is certified that error appears in the above-identified patent and that said Letters Patent is hereby corrected as shown below:

In the Claims

In Column 7, Line 9, delete "of product of product" and replace with -- of product --

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*